United States Patent [19]

Kato

[11] 4,189,034
[45] Feb. 19, 1980

[54] HYDRAULIC DAMPER

[75] Inventor: Tetuo Kato, Yokohama, Japan

[73] Assignee: Tokico Ltd., Kawasaki, Japan

[21] Appl. No.: 922,163

[22] Filed: Jul. 5, 1978

Related U.S. Application Data

[63] Continuation of Ser. No. 777,545, Mar. 14, 1977, abandoned.

[30] Foreign Application Priority Data

Mar. 19, 1976 [JP] Japan ................................. 51-30615

[51] Int. Cl.$^2$ .............................................. F16F 9/06
[52] U.S. Cl. ................................................. 188/318
[58] Field of Search ............... 188/269, 311, 314–318; 267/64 A

[56] References Cited

U.S. PATENT DOCUMENTS

| | | | |
|---|---|---|---|
| 2,036,955 | 4/1936 | Padgett | 188/269 |
| 2,939,696 | 6/1960 | Tuczek | 188/269 X |
| 3,127,958 | 4/1964 | Szostak | 188/318 X |
| 3,220,517 | 11/1965 | Lorenz | 188/318 |
| 3,661,236 | 5/1972 | Wossner | 188/315 |

*Primary Examiner*—Duane A. Reger
*Attorney, Agent, or Firm*—Wenderoth, Lind & Ponack

[57] ABSTRACT

A hydraulic damper of the type having a cylinder defining an actuating chamber receiving hydraulic oil therein, a piston working in the actuating chamber, a piston rod with one end thereof secured to the piston and the other end thereof projecting from one end of the cylinder, a resisting force generating device mounted on the piston for controlling oil flow across the piston when the piston reciprocates in the actuating chamber, and a volume compensating chamber disposed adjacent to the actuating chamber and receiving gas and hydraulic oil therein. The hydraulic oil is caused to flow between the actuating chamber and the volume compensating chamber through a small hole. The cross-sectional area of the small hole is such that a pressure sufficient to actuate the resisting force generating device is generated in the actuating chamber with or without the aid of gas pressure in the volume compensating chamber when the piston moves in a contraction stroke, whereby the gas pressure in the damper is reduced substantially.

2 Claims, 5 Drawing Figures

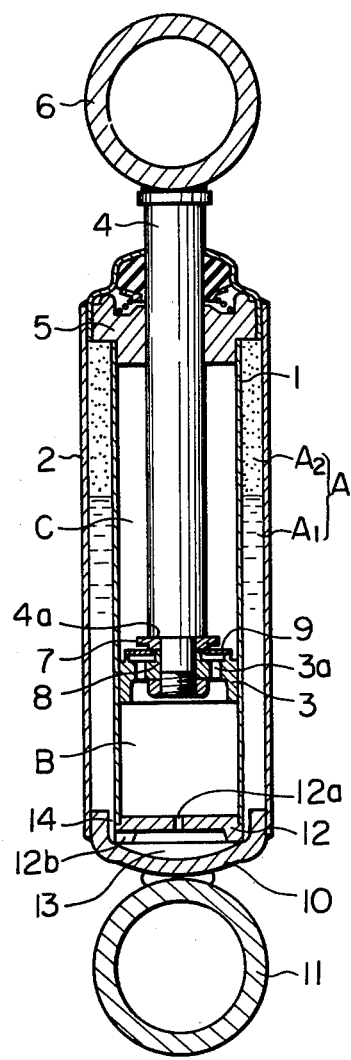

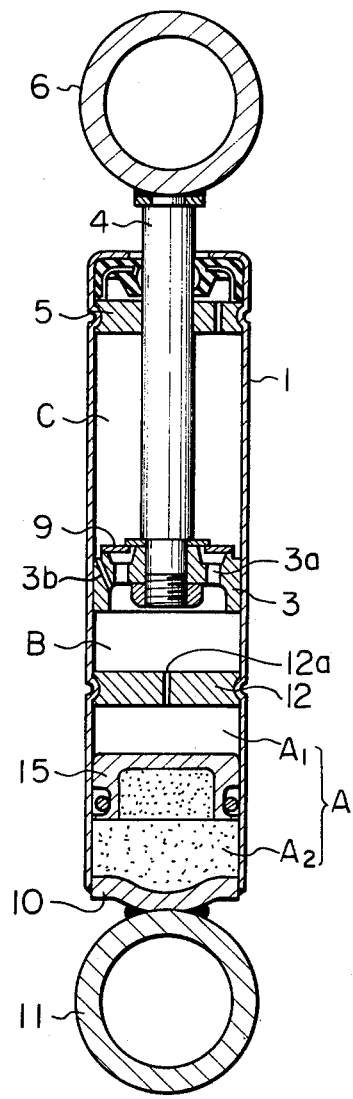
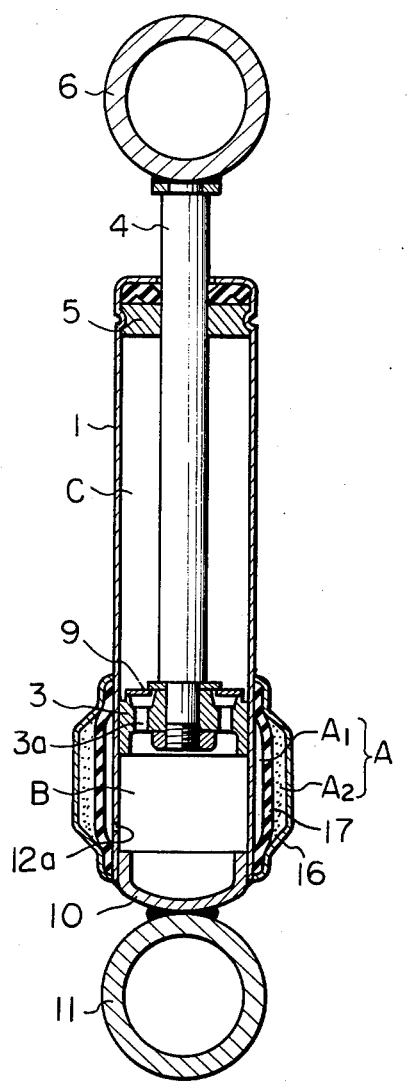

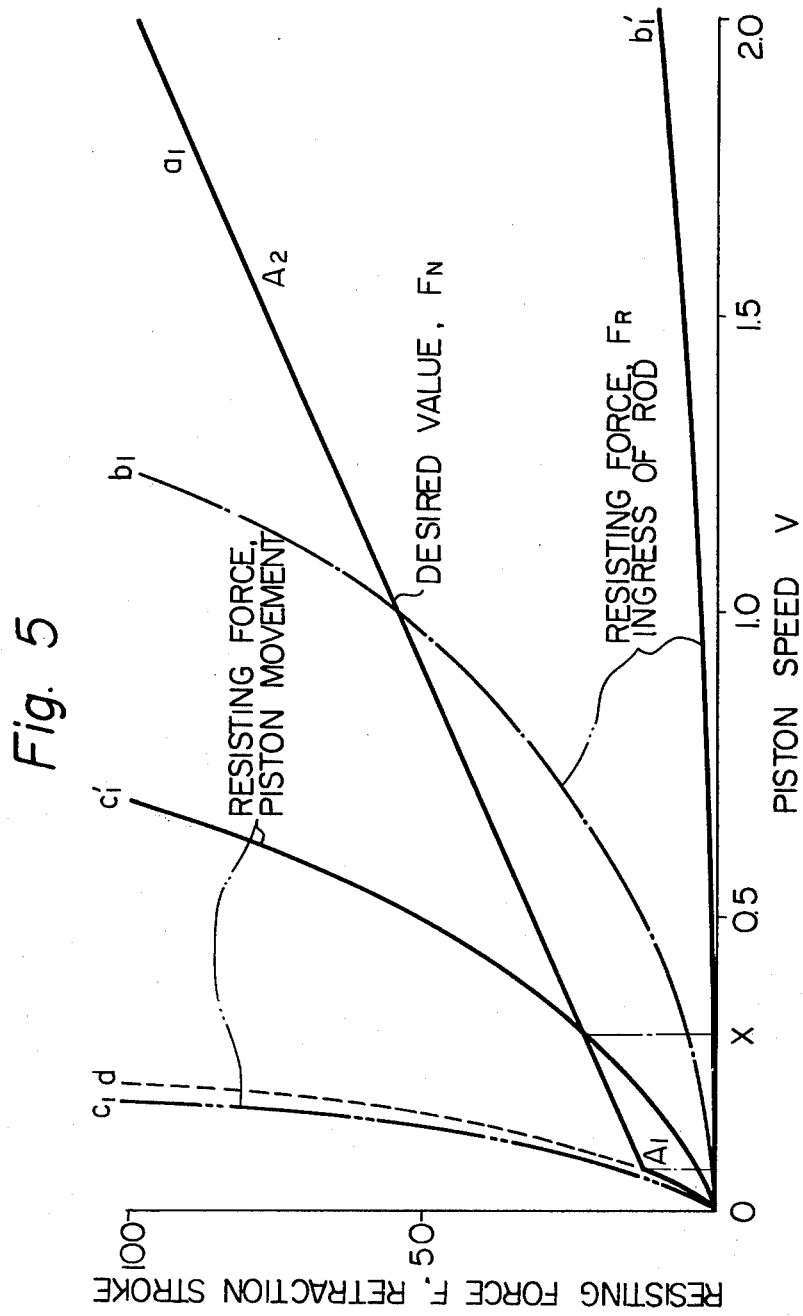

4,189,034

HYDRAULIC DAMPER

This is a continuation of application Ser. No. 777,545, filed Mar. 14, 1977, now abandoned.

The present invention relates to hydraulic dampers which are adapted to damp or alleviate vibrations of an automobile or the like.

One prior art hydraulic damper of the gas enclosed type comprises a piston and piston rod assembly slidably fitted in a cylinder containing oil therein, a resisting force generating mechanism mounted on a piston portion of the piston and piston rod assembly to generate a hydraulic resisting force against reciprocating movement of the assembly in both directions, and a high pressure gas chamber for compensating for the change in volume caused by ingress or exit of the piston rod relative to the cylinder. The high pressure gas chamber is formed in the cylinder and is partitioned off by a free piston or the like; alternatively, the chamber is defined in the upper portion of an annular chamber provided between the outer surface of the cylinder and an outer tube disposed around the cylinder, and the lower portion of the annular chamber is in communication with the interior of the cylinder.

Usually a gas at a very high pressure is enclosed in the cylinder and, therefore, the construction is expensive and, since the high pressure gas acts directly on a seal member disposed in the damper the seal member tends to wear which will cause the gas or liquid tightness of the damper to deteriorate. The durability of the damper is impaired and moreover it is very dangerous if the cylinder is broken. The seal member must withstand the high pressure which increases manufacturing costs.

An object of the present invention is to provide a hydraulic damper including a resisting force generating mechanism on the piston portion which generates resisting force when the piston moves in opposite directions and generates damping forces equivalent to that of prior art hydraulic dampness, and a gas at a very low pressure enclosed therein.

Other objects and effects of the present invention will be understood from reading the following description taken with the accompanying drawings, in which:

FIG. 1 is a longitudinal cross-sectional view of a first embodiment of a hydraulic damper according to the present invention;

FIG. 2 is a longitudinal cross-sectional view of a second embodiment of a hydraulic damper according to the present invention;

FIG. 3 is a longitudinal cross-sectional view of a third embodiment of the present invention; and FIGS. 4 and 5 are diagrams showing the relationship between piston speed and resisting force.

Figure 4:
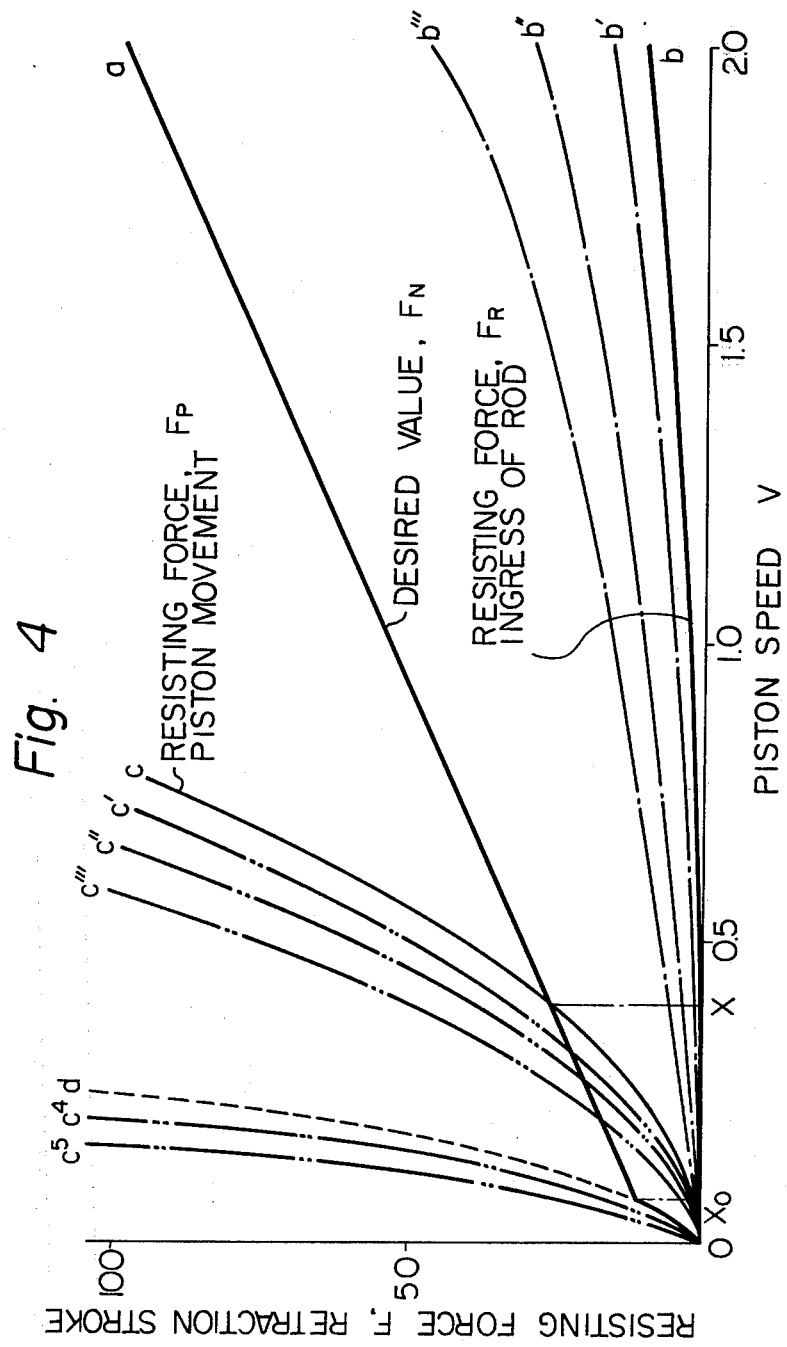

FIG. 1 shows a dual tube hydraulic damper having a construction generally similar to that of a prior art hydraulic damper used widely in a suspension system of an automobile or the like. The damper comprises a cylinder 1 filled with hydraulic oil and constituting an actuating chamber. An outer tube 2 surrounds the cylinder 1 to define therebetween an annular volume compensating chamber A consisting of an oil chamber $A_1$ and gas chamber $A_2$. A piston 3 is slidably fitted in the cylinder 1 and partitions the actuating chamber in the cylinder 1 into oil chambers B and C. The piston 3 is secured to one end of a piston rod 4, and the other end of the piston rod 4 extends through a rod guide 5 and projects outside of the cylinder 1 and carries a mounting ring 6. A washer 7 is fitted on a reduced diameter portion of the piston rod 4 and bears on a shoulder portion 4a. A retainer 8 is disposed in overlapping relation with the washer 7. A valve disc 9 forming a resisting force generating mechanism is supported on one side of the outer periphery thereof on an annular projecting portion formed on the piston 3 and, on the other side (the upper side) of the inner periphery thereof on the outer periphery of the retainer 8. The valve disc 9 deflects upward or downward to form an annular passage across the piston at the outer or the inner periphery of the disc 9. The lower end of the outer tube 2 is closed by a bottom cap 10, and a mounting ring 11 is secured to the bottom cap 10 by welding or the like. The lower end of the cylinder 1 is closed by a partitioning wall 12 having a small hole 12a therethrough. The oil chamber B is communicated permanently with the oil chamber $A_1$ through the small hole 12a, a space 13 between the wall 12 and the bottom cap 10, a cut-out portion 12b in the wall 12, and a passage 14 formed between the bottom cap 10 and the outer periphery of the cylinder 1.

In this embodiment the small hole 12a is formed in the wall 12, but the hole 12a may be formed in the lower end portion of the side wall of the cylinder 1 to connect the chambers $A_1$ and B directly.

The construction of the hydraulic damper shown in FIG. 1 is generally similar to that of the prior art hydraulic damper, but according to the present invention the diameter of the small hole 12a is reduced relative to the prior art damper and which make it possible to reduce the pressure of the gas enclosed in the gas chamber $A_2$, and the function of which described in detail hereinafter.

In the extension stroke of the damper, i.e., when an assembly consisting of piston 3 and the piston rod 4 moves upward in the drawing, oil in the oil chamber C on the upper side of the piston 3 and filled with oil will be pressurized and tends to deflect the inner periphery of the valve disc 9 downward and flows into oil chamber B whereby a resisting force is generated. An amount of oil corresponding to the upward movement of the piston rod 4 is caused to flow into the oil chamber B from the oil chamber $A_1$ through the small hole 12a with a relatively small resisting force.

Inm the contraction stroke of the damper, i.e., when the assembly 3, 4 moves downward in the drawing, oil in the oil chamber B is pressurized and deflects the outer periphery of the valve disc 9 upwardly and will flow into the chamber C. An amount of oil corresponding to the ingress of the piston rod 4 into the cylinder 1 or the downward movement of the piston rod 4 will flow through the small hole 12a into the oil chamber $A_1$, whereby, a resisting force will be generated.

It is assumed that the speed range of the piston is 0-2 m/s which is conventional in hydraulic dampers used in vehicle suspension systems and, that the diameters of the piston and the piston rod are 25 mm and 12.5 mm respectively, which are standard sizes used widely in automobiles. Further, it is assumed that the desired resisting force $F_N$ generated in the hydraulic damper in the contraction or retraction stroke will be according to line "a" in FIG. 4 and the maximum value $F_{N}max$ is 100 kg when the piston speed is 2 m/s.

When the piston rod 4 ingresses into the cylinder 1, an oil of an amount corresponding to the volume of the rod will pass through the small hole 12a and a resisting force $F_R$ (which will be referred hereinafter as the force of resistance to rod ingress) will be generated. The force $F_R$ is denoted by the following equation.

$$F_R = CA^3/a^2 \times V \quad (1)$$

wherein, C is a constant, A is the cross-sectional area of the piston rod 4, a is the cross-sectional area of the small hole 12a, and V is the piston speed. The maximum value $F_R$ max is assumed to be 10% of $F_N$ max or 10 kg when the piston speed is 2.0 m/s, (so that a value 3.4 mm is obtained for the diameter of the hole 12a), and which is depicted by line "b" in FIG. 4.

Similarly, when the piston 3 moves downward in the cylinder 1 an amount of oil corresponding to the movement of the piston is assumed to pass through the small hole 12a, then, a resisting force $F_P$ (which is referred hereinafter as the force of resistance to piston movement) and is depicted by line "c" in FIG. 4, which is obtained from entering the value 3.4 mm as the diameter of the hole 12a into an equation similar to the equation (1).

As shown clearly in FIG. 4 the force of resistance to piston movement $F_P$ becomes larger than the required resisting force $F_N$ when the piston speed exceeds a predetermined value X. In other words, when the piston speed exceeds the value X the valve disc 9 will deflect to generate the desired or normal resisting force $F_N$ by a pressure generated in the oil chamber B.

By increasing pressure in the compensating chamber A it is possible to cause deflection of the valve disc 9 when the piston speed is below the value X. (It will be noted that the pressure in the chamber A is assumed to be atmospheric pressure in obtaining the resisting force $F_R$ and $F_P$.)

The pressure P in the compensating chamber A required for overcoming the force of the valve disc 9 in a region where the piston speed is below the value X can be denoted by:

$$P = \text{maximum value of } (F_N - F_P)/A_P \quad (2)$$

wherein $A_P$ is the cross-sectional area of the piston. Thus, when the diameter of the hole 12a is 3.4 mm, the value of P is calculated to be about 2.4 kg/cm$^2$.

When the diameter of the small hole 12a is reduced, the force of resistance to rod ingress $F_R$ and the force of resistance to piston movement $F_P$ will change as shown by chain line b', b'', b''' and c', c'', c''' in FIG. 4. Thus the pressure P can also be decreased.

In FIG. 4, the desired resisting force $F_N$ is shown to change along a line "d" when the piston speed is below a predetermined value $X_o$. The line "d" is attained by a fixed orifice bypassing the valve disc 9 (not shown in FIG. 1, but shown as 3b in FIG. 2 which will be described later), and defines the starting characteristic of the hydraulic damper.

By decreasing the diameter of the small hole 12a further, it is possible to obtain line $C^4$ or $C^5$ for the force of resistance to piston movement $F_P$, which shows that the desired characteristics of the damper can be attained with atmospheric gas pressure enclosed in the volume compensating chamber A by suitably dimensioning the cross-sectional area of the small hole 12a.

The description has been given with reference to a hydraulic damper having a specified dimension, but it will be noted that the diameter of the piston, the diameter of the rod, the maximum piston speed, and the maximum resisting force F max may be changed as desired.

The small hole 12a according to the present invention has not been provided in prior art hydraulic dampers, in which the gas pressure in the volume compensating chamber acts directly on the lower side of the piston (oil chamber B) and, thus, when the gas pressure in the compensating chamber is low a differential pressure sufficient to actuate the resisting force generating mechanism (to deflect the valve disc) will not be generated across the piston, whereby the desired characteristics of the hydraulic damper cannot be obtained.

In a embodiment of a prior art hydraulic damper with principal dimensions similar to the first embodiment of the specified dimensions, the diameter of the piston is 25 mm, the diameter of the piston rod is 12.5 mm, the maximum piston speed is 2 m/s and the maximum resisting force F max is 100 kg. Then, gas pressure P which is required to overcome the resisting force of the valve disc 9 is:

$$P = F\text{max}/(A_P - A_R) = 25 \text{ kg}$$

wherein, $A_P$ is cross-sectional area of the piston, and $A_R$ is cross-sectional area of the piston rod.

Accordingly, it will be understood that the pressure of the gas enclosed in the hydraulic damper of the present invention can be reduced to as low as one tenth of that in the prior art hydraulic damper.

The embodiment illustrated in FIG. 2 is a single tube type hydraulic damper adapted to be used on a steering wheel and parts corresponding to those in FIG. 1 are denoted by similar numerals. In the embodiment, a volume compensating chamber A is formed in the cylinder 1 and is partitioned by a partitioning wall 12 from the actuating chambers B and C. In the volume compensating chamber A a free piston 15 is slidably fitted in the cylinder to divide the chamber A into an oil chamber $A_1$ and a gas chamber $A_2$. A small hole 12a is formed in the wall 12. In the drawing, a fixed orifice 3b is formed in the piston 3 for connecting the oil chambers B and C permanently to improve the damping characteristics of the hydraulic damper when the piston speed is a predetermined low speed (starting characteristics).

FIG. 5 is a diagram of the characteristic curves for the embodiment of FIG. 2 and is similar to FIG. 4. The line $a_1$ ($OA_1A_2$) shows the desired resisting force $F_N$, and the line $OA_1$ is attained by the fixed orifice 3b, and the line $A_1A_2$ by the deflection of the valve disc 9. The force of resistance to rod ingress $F_R$ is shown by line $b_1$, and the force of resistance to piston movement $F_P$ is shown by line $c_1$.

The damper of the second embodiment is adapted particularly for use with a steering wheel and is referred to hereinafter as steering damper.

The working speed of the piston in a steering damper is usually 0-0.6 m/s, and the ratio of the diameter of the piston to that of the piston rod is usually about 3:1 while that in the hydraulic damper for a suspension system the ratio is about 2:1.

Therefore, the difference between oil flow flowing through the fixed orifice 3b and that flowing through the small hole 12a is larger than that in the first embodiment, and by making the diameter of the small hole 12a less than that of the fixed orifice 3b, the line $c_1$ of the force of resistance to piston movement $F_P$ is given a gradient steeper than that of the line d for the fixed orifice. The force of resistance to rod ingress $F_R$, accordingly, has a gradient steeper than that of the first embodiment which is shown by full line $b_1'$. Since the line $c_1$ is steeper than the line d, the gas pressure in the gas chamber $A_2$ can be reduced to atmospheric pressure, and the damper will act satisfactorily in the working range of the piston speed of 0–0.6 m/s.

In the extension stroke of the damper, the oil chamber C is pressurized, and the pressurized oil can deflect the inner periphery of the valve disc 9 and flow into the oil chamber B. An amount of oil corresponding to movement of the piston rod 4 outward of the cylinder 1 flows into the oil chamber B with a small resisting force generated thereon. The gas in the gas chamber $A_2$ expands, and the free piston 15 moves accordingly toward the oil chamber C. The gas pressure in the chamber A has to overcome the sliding resisting force of the free piston 15.

FIG. 3 shows another embodiment of a steering damper, and includes a volume compensating chamber A disposed around a part of the outer surface of cylinder 1. Otherwise, the embodiment is generally similar to FIGS. 1 and 2, and corresponding numerals are applied to corresponding parts.

An outer tube 16 surrounds the lower portion of the outer periphery of cylinder 1 and a flexible tubular member 17 formed of, preferably, a resilient material such as rubber or the like is clamped at the opposite ends thereof between the outer tube 16 and the cylinder 1, whereby, an annular chamber $A_1$ for receiving oil therein is formed between the flexible member 17 and the cylinder 1 and an annular chamber $A_2$ for receiving gas therein is formed between the flexible member 17 and the outer tube 16. A small hole 12a permanently connecting the oil chambers B and $A_1$ is formed in the wall of the cylinder 1.

The construction and the operation of the embodiment of FIG. 3 is otherwise the same as that of FIG. 2, and a detailed description thereof will be omitted. In the embodiment, the flexible cylindrical member 17 will automatically follow the movement of the piston rod 3 in the extending direction when oil in the oil chamber $A_1$ of the volume compensating chamber A flows into the oil chamber B through the small hole 12a, and pressurized gas may not necessarily be enclosed in the gas chamber $A_2$.

As described heretofore in detail the hydraulic damper according to the present invention comprises an actuating chamber receiving a piston slidably therein, a volume compensating chamber disposed adjacent to the actuating chamber for compensating for a change in volume which is caused by ingress or exit of a piston rod relative to the actuating chamber, and a small hole connecting the actuating chamber to the volume compensating chamber and adapted to generate a resisting force larger than that of a resisting force generating mechanism disposed on the piston, whereby the pressure of the gas enclosed in the compensating chamber can be reduced considerably, so that equipment for filling gas into the hydraulic damper can be simplified and the construction of the damper can be simplified and, further, the durability of the damper can be increased.

What is claimed is:

1. In a hydraulic damper having a cylinder having an actuating chamber therein for containing hydraulic oil, a piston slidable in the actuating chamber and partitioning said actuating chamber into upper and lower portions, a piston rod having one end thereof being secured to the piston and the other end thereof projecting through the upper end of the cylinder to the outside, a resisting force generating means mounted on the piston for controlling oil flow across the piston for generating resisting force against the movement of the piston in both directions in the cylinder, a volume compensating chamber disposed around the actuating chamber and having hydraulic oil and gas therein for compensating for the change in volume of hydraulic oil in the actuating chamber caused by ingress or exit of the piston rod into or out of the actuating chamber, and unvalved passage means for the hydraulic oil permanently connecting only the lower end of said volume compensating chamber with the lower portion of said actuating chamber, the improvement wherein said passage means has a hydraulic oil passage therethrough with a cross-sectional size for generating a pressure in the lower portion of said actuating chamber which increases with an increase in the flow rate therethrough and which is substantially higher than that of the volume compensating chamber and than that of the upper portion of the actuating chamber when the piston moves at the maximum speed in the contraction stroke of the damper, whereby the pressure of the gas in said volume compensating chamber necessary for causing opening of said resisting force generating means can be substantially reduced.

2. A hydraulic damper according to claim 1 wherein said hydarulic oil passage is a small hole through the wall of the actuating chamber.

* * * * *

REEXAMINATION CERTIFICATE (72nd)

United States Patent [19]
Kato

[11] B1 4,189,034

[45] Certificate Issued  Apr. 12, 1983

[54] HYDRAULIC DAMPER

[75] Inventor: Tetuo Kato, Yokohama, Japan

[73] Assignee: Tokico Ltd., Kawasaki, Japan

Reexamination Request:
No 90/000,189, Apr. 13, 1982

Reexamination Certificate for:
Patent No.: 4,189,034
Issued: Feb. 19, 1980
Appl. No.: 922,163
Filed: Jul. 5, 1978

Related U.S. Application Data

[63] Continuation of Ser. No. 777,545. Mar. 14, 1977, abandoned.

[30] Foreign Application Priority Data

Mar. 19, 1976 [JP] Japan ................ 51-30615

[51] Int. Cl.$^3$ .............................................. F16F 9/06
[52] U.S. Cl. .................................................. 188/318
[58] Field of Search ....... 188/315, 318, 322.13, 322.14

[56] References Cited

FOREIGN PATENT DOCUMENTS

| | | |
|---|---|---|
| 48-3261 | 1/1969 | Japan. |
| 48-3262 | 1/1969 | Japan. |
| 47-46546 | 1/1969 | Japan. |
| 47-46547 | 1/1969 | Japan. |
| 47-46549 | 6/1969 | Japan. |
| 47-16873 | 2/1971 | Japan. |
| 49-97168 | 1/1973 | Japan. |
| 726898 | 7/1952 | United Kingdom. |
| 1077587 | 1/1969 | United Kingdom. |

*Primary Examiner*—Duane A. Reger

*Attorney, Agent, or Firm*—Wegner & Bretschneider

[57] ABSTRACT

A hydraulic damper of the type having a cylinder defining an actuating chamber receiving hydraulic oil therein, a piston working in the actuating chamber, a piston rod with one end thereof secured to the piston and the other end thereof projecting from one end of the cylinder, a resisting force generating device mounted on the piston for controlling oil flow across the piston when the piston reciprocates in the actuating chamber, and a volume compensating chamber disposed adjacent to the actuating chamber and receiving gas and hydraulic oil therein. The hydraulic oil is caused to flow between the actuating chamber and the volume compensating chamber through a small hole. The cross-sectional area of the small hole is such that a pressure sufficient to actuate the resisting force generating device is generated in the actuating chamber with or without the aid of gas pressure in the volume compensating chamber when the piston moves in a contraction stroke, whereby the gas pressure in the damper is reduced substantially.

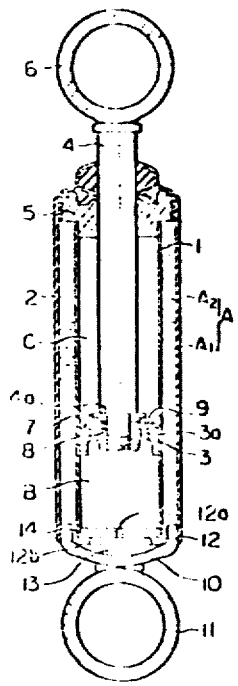

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 2, dependent on an amended claim, is determined to be patentable.

1. In a hydraulic damper having a cylinder having an actuating chamber therein for containing hydraulic oil, a piston slidable in the actuating chamber and partitioning said actuating chamber into upper and lower portions, a piston rod having one end thereof being secured to the piston and the other end thereof projecting through the upper end of the cylinder to the outside, a resisting force generating means mounted on the piston for controlling oil flow across the piston for generating resisting force against the movement of the piston in both directions in the cylinder, a volume compensating chamber disposed around the actuating chamber and having hydraulic oil and gas therein for compensating for the change in volume of hydraulic oil in the actuating chamber caused by ingress or exit of the piston rod into or out of the actuating chamber, and unvalved passage means for the hydraulic oil permanently connecting only the lower end of said volume compensating chamber with the lower portion of said actuating chamber, the improvement wherein said passage means has a hydraulic oil passage therethrough with a cross-sectional size for generating a pressure in the lower portion of said actuating chamber which increases with an increase in the flow rate therethrough and which is substantially higher than that of the volume compensating chamber and than that of the upper portion of the actuating chamber when the piston moves at the maximum speed in the contraction stroke of the damper, whereby the pressure of the gas in said volume compensating chamber necessary for causing opening of said resisting force generating means can be substantially reduced *to atmospheric pressure.*

* * * * *